United States Patent [19]
Allen et al.

[11] Patent Number: 5,708,876
[45] Date of Patent: Jan. 13, 1998

[54] ONE-TIME-USE CAMERA WITH COMBINED SHUTTER-FLASH SYNCHRONIZATION CONTACT AND HOLDER FOR FLASH CAPACITOR AND BATTERY

[75] Inventors: Michael R. Allen, Churchville; Jude A. Sangregory, Spencerport, both of N.Y.

[73] Assignee: Eastman Kodak Company, Rochester, N.Y.

[21] Appl. No.: 782,989

[22] Filed: Jan. 14, 1997

[51] Int. Cl.$^6$ .................................................. G03B 15/03
[52] U.S. Cl. ........................... 396/176; 396/6; 396/195
[58] Field of Search ................................ 396/6, 176, 177, 396/178, 195, 535, 539, 542

[56] References Cited

U.S. PATENT DOCUMENTS

| | | | |
|---|---|---|---|
| 5,028,943 | 7/1991 | Ishii et al. | 354/145.1 |
| 5,170,199 | 12/1992 | Nakai et al. | 354/126 |
| 5,235,364 | 8/1993 | Ohmura et al. | 354/149.11 |
| 5,436,685 | 7/1995 | Yamashina | 354/202 |
| 5,608,486 | 3/1997 | Takagi et al. | 396/176 X |

FOREIGN PATENT DOCUMENTS 6-202219   7/1994   Japan .

*Primary Examiner*—Howard B. Blankenship
*Attorney, Agent, or Firm*—Roger A. Fields

[57] ABSTRACT

A camera comprises a shutter-flash synchronization contact, a pair of battery contacts, a flash capacitor, and a flash circuit board conductively connected to the shutter-flash synchronization contact, the pair of battery contacts and the flash capacitor. A holder which holds the flash capacitor is conductively connected to the flash circuit board and is integrally united with the shutter-flash synchronization contact and the pair of battery contacts to conductively connect the shutter-flash synchronization contact and the battery contacts to the flash circuit board. As a result, the camera can be made relatively compact.

16 Claims, 5 Drawing Sheets

ONE-TIME-USE CAMERA WITH COMBINED SHUTTER-FLASH SYNCHRONIZATION CONTACT AND HOLDER FOR FLASH CAPACITOR AND BATTERY

FIELD OF THE INVENTION

The invention relates generally to the field of photography, and in particular to cameras. More specifically, the invention relates to a camera with a combined shutter-flash synchronization contact and holder for a flash capacitor and a flash-powering battery.

BACKGROUND OF THE INVENTION

Prior art U.S. Pat. No. 5,235,364 issued Aug. 10, 1993 points out the desire to make one-time-use flash cameras relatively compact. This is done primarily by re-arranging the electronic flash and certain related camera components including a shutter-flash synchronization contact, a pair of battery contacts for a flash-powering battery, a flash capacitor, and a flash circuit board which is conductively connected to the shutter-flash synchronization contact, the battery contacts and the flash capacitor.

SUMMARY OF THE INVENTION

A camera comprising a shutter-flash synchronization contact, a pair of battery contacts, a flash capacitor, and a flash circuit board conductively connected to the shutter-flash synchronization contact, the pair of battery contacts and the flash capacitor, is characterized in that:

a holder which holds the flash capacitor is conductively connected to the flash circuit board and is integrally united with the shutter-flash synchronization contact and the pair of battery contacts to conductively connect the shutter-flash synchronization contact and the battery contacts to the flash circuit board.

As a result, the camera can be made relatively compact.

DETAILED DESCRIPTION OF THE INVENTION

The invention is disclosed as being embodied preferably in a one-time-use flash camera such as disclosed in U.S. Pat. No. 5,235,364. Because the features of a one-time-use flash camera are generally known, the description which follows is directed in particular only to those elements forming part of or cooperating directly with the disclosed embodiment. It is to be understood, however, that other elements may take various forms known to a person of ordinary skill in the art.

Figure 1:
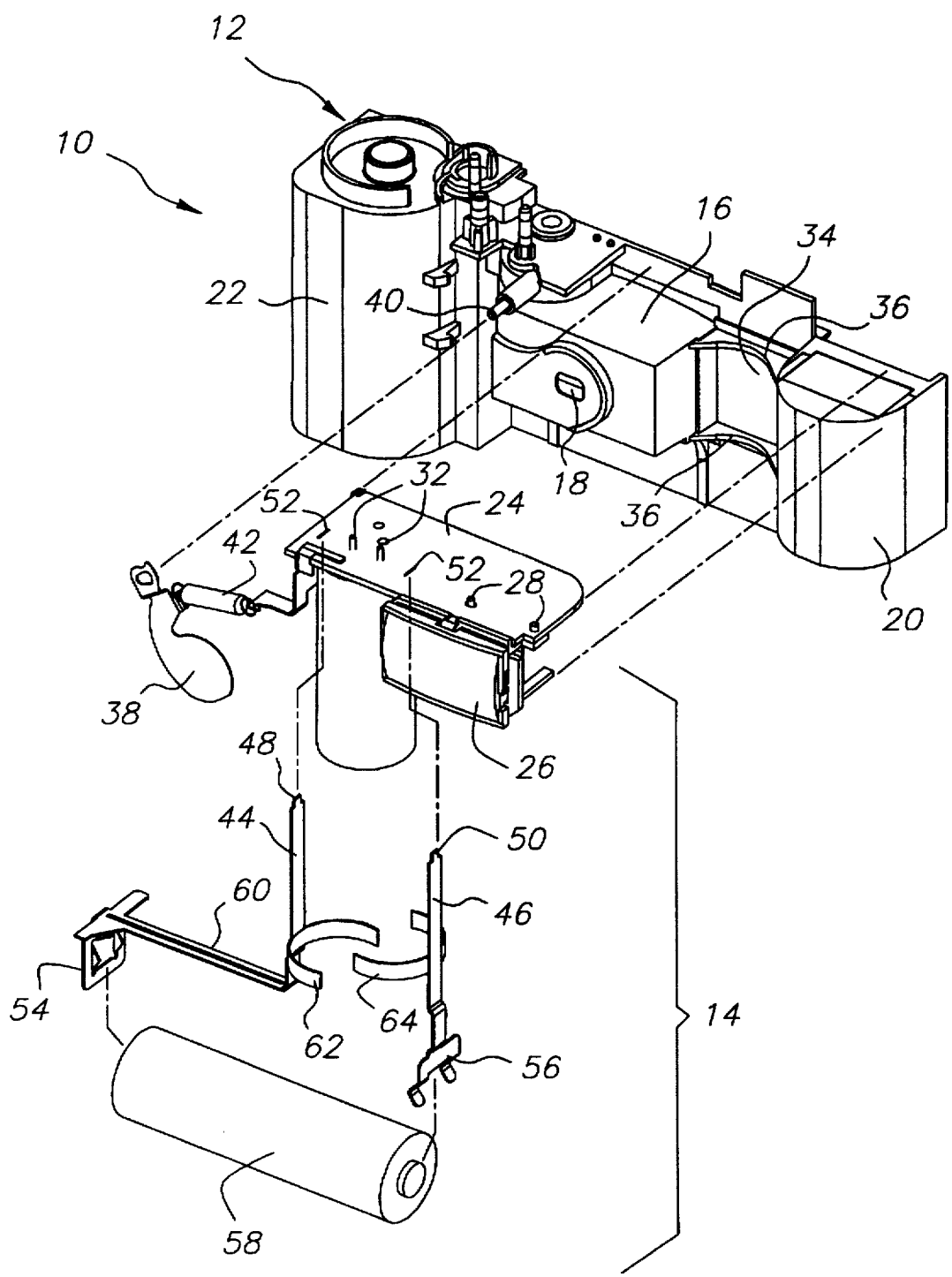
FIG. 1 is a front exploded perspective view of a one-time-use flash camera according to a preferred embodiment of the invention.
Figure 2:
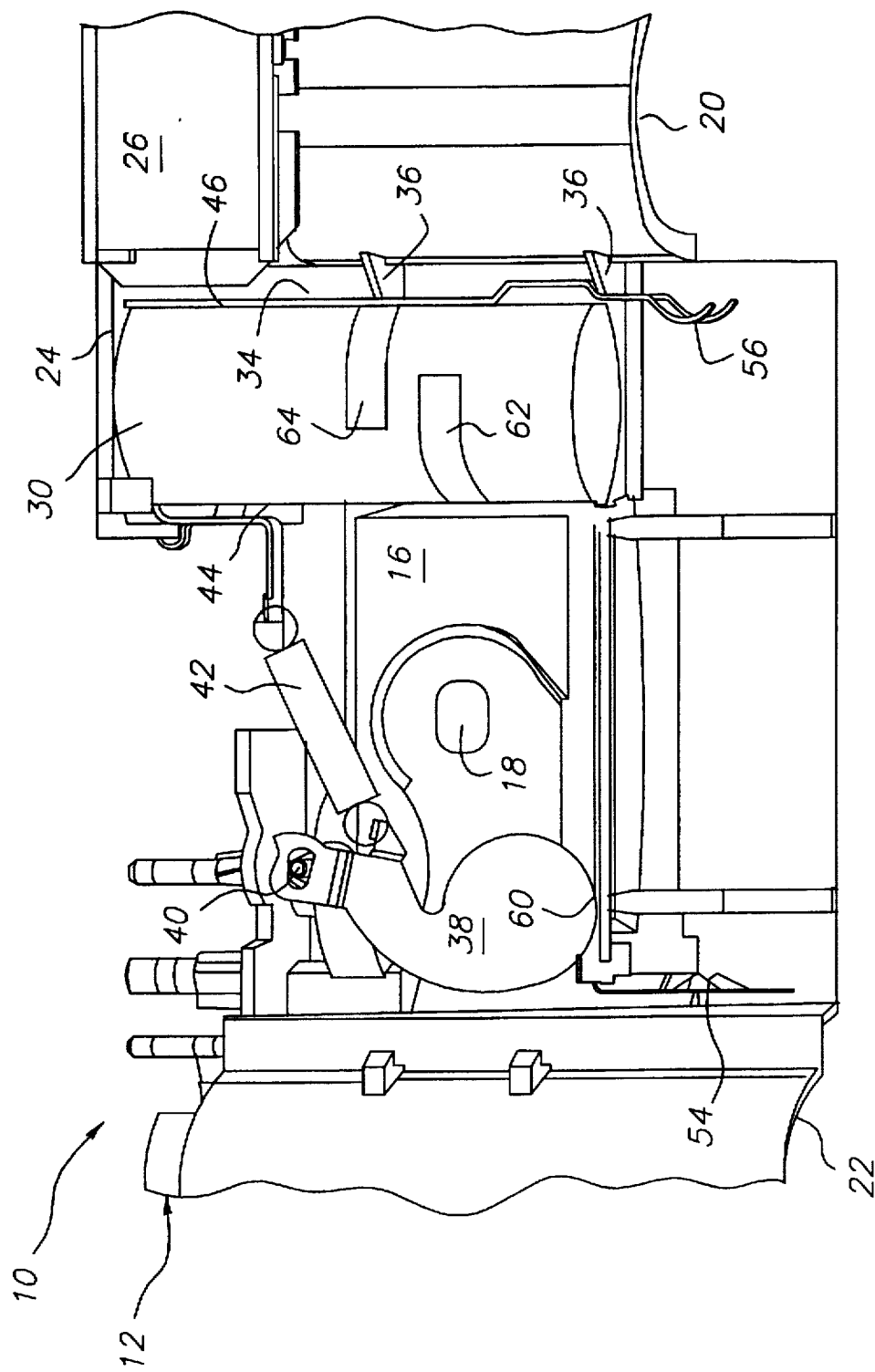
FIG. 2 is a front elevation view of the camera.

Preferred Embodiment (FIGS. 1 and 2)

Referring now to the drawings, FIGS. 1 and 2 show a preferred embodiment of a one-time-use flash camera 10 comprising a plastic main body part 12 and an electronic flash assembly 14. A pair of plastic front and rear cover parts for the main body part 12 are not shown.

As shown in FIG. 1, the main body part 12 has a light tunnel 16 for receiving ambient light, reflected from a subject to be photographed, through a lens opening 18 at the front of the lens tunnel to expose successive sections of a filmstrip over a backframe opening (not shown) at the rear of the lens tunnel. A film roll chamber 20 for an unexposed-film roll (not shown) and a cartridge chamber 22 for an exposed-film cartridge (not shown) are spaced from opposite sides of the light tunnel 16.

The electronic flash assembly 14 includes a substantially flat flash circuit board 24 fixed longitudinally horizontal and above the film roll chamber 20. See FIG. 1. A transparent flash cover 26 hangs down from the flash circuit board 24 and is located in front of a flash reflector and a flash tube (not shown). The flash cover 26 is coupled with the flash tube and the flash reflector, and the flash tube is conductively connected to the flash circuit board 24 at two solder points 28 on the board. A flash capacitor 30 coated or layered with an insulating material is conductively connected to the flash circuit board 24 at two solder points 32 on the board. The flash capacitor 30 hangs down from the flash circuit board 24 and is located longitudinally vertical in a nest 34 between the light tunnel 16 and the film roll chamber 20. A pair of parallel ribs 36 on the main body part 12 support the flash capacitor 30 in the nest 34.

A metal shutter blade 38 is supported via a pin 40 projecting from the main body part 12 for movement between a lens covering position over the lens opening 18 and a lens uncovering position, shown in FIGS. 1 and 2, removed from the lens opening. A metal return spring 42 biases the shutter blade 38 to the lens covering position and is disposed to conductively connect the shutter blade to the flash circuit board 24.

As shown in FIGS. 1 and 2, a pair of spaced resilient metal leads 44 and 46 have respective upper ends 48 and 50 that are conductively connected to the flash circuit board 24 at two solder points 52 on the board and have respective lower ends that are opposed negative and positive battery contacts 54 and 56. The respective battery contacts 54 and 56 are located adjacent the cartridge chamber 22 and the film roll chamber 20 to hold a flash-powering battery 58 between them, longitudinally horizontal and below the light tunnel 16. The lead 44 has an integral shutter-flash synchronization contact 60 that is disposed to be conductively contacted by the shutter blade 38 when the shutter blade is in its lens uncovering position, shown in FIG. 2. This is done to sequence the flash illumination between the initial and completed lens uncovering as is typical. The two leads 44 and 46 have respective c-shaped capacitor clasps 62 and 64 that are offset from one another to hold the flash capacitor 30 between them without the capacitor clasps touching each other. As can be seen in FIG. 1, the flash capacitor 24 is located perpendicular to and between the flash circuit 30 and the flash-powering battery 58.

Figure 3:
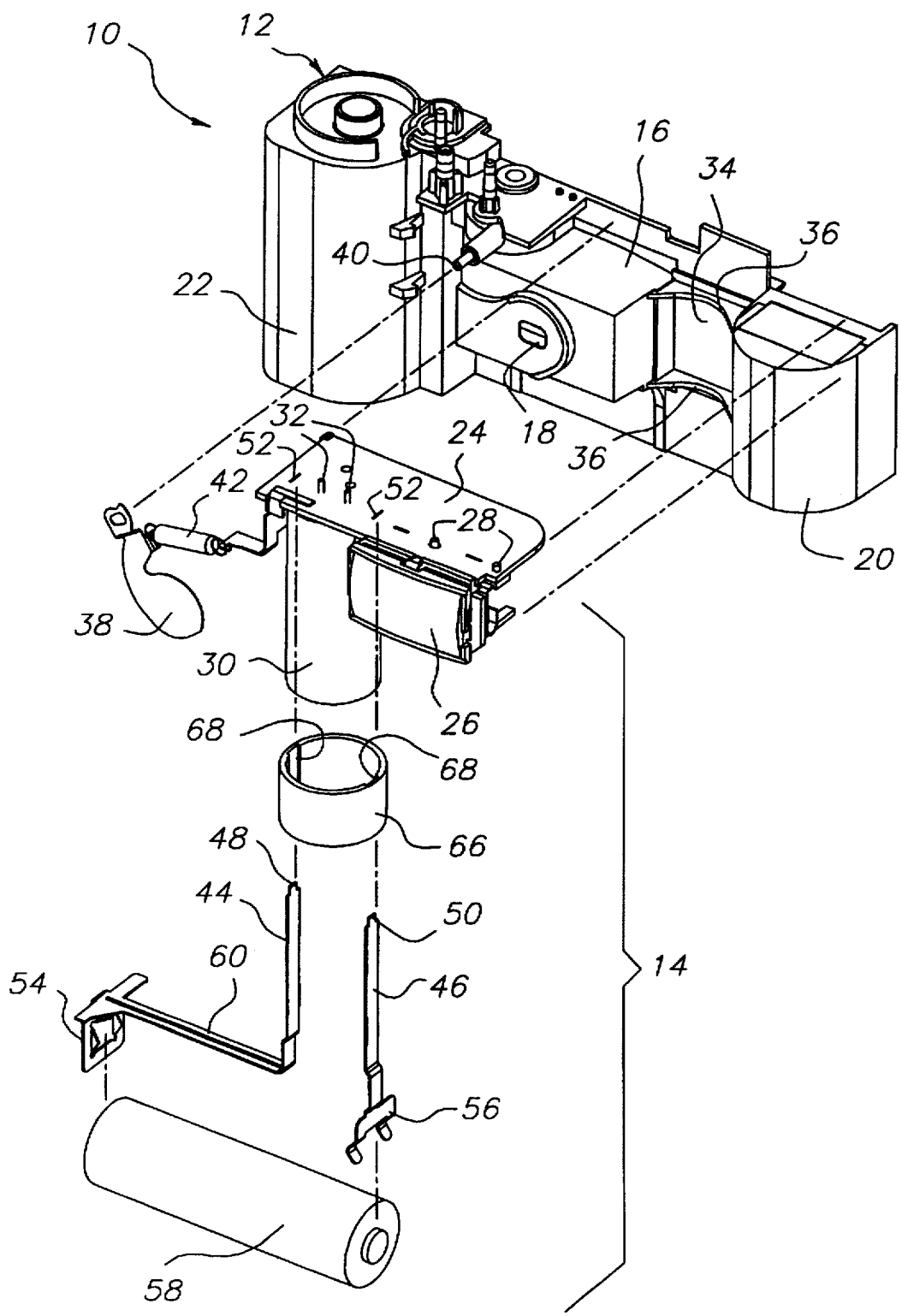
FIG. 3 is a front exploded perspective view of a one-time-use flash camera according to a first alternate embodiment of the invention.

First Alternate Embodiment (FIG. 3)

FIG. 3 shows an alternate embodiment of the one-time-use flash camera 10 which is the same as in FIGS. 1 and 2 except that in place of the capacitor clasps 62 and 64 there is provided a plastic ring 66 dimensioned to encircle the flash capacitor 30 and the two leads 44 and 46 to hold the flash capacitor between the leads. The ring 66 has respective inside grooves 68 that receive the two leads 44 and 46 to couple the ring with the leads.

Figure 4:
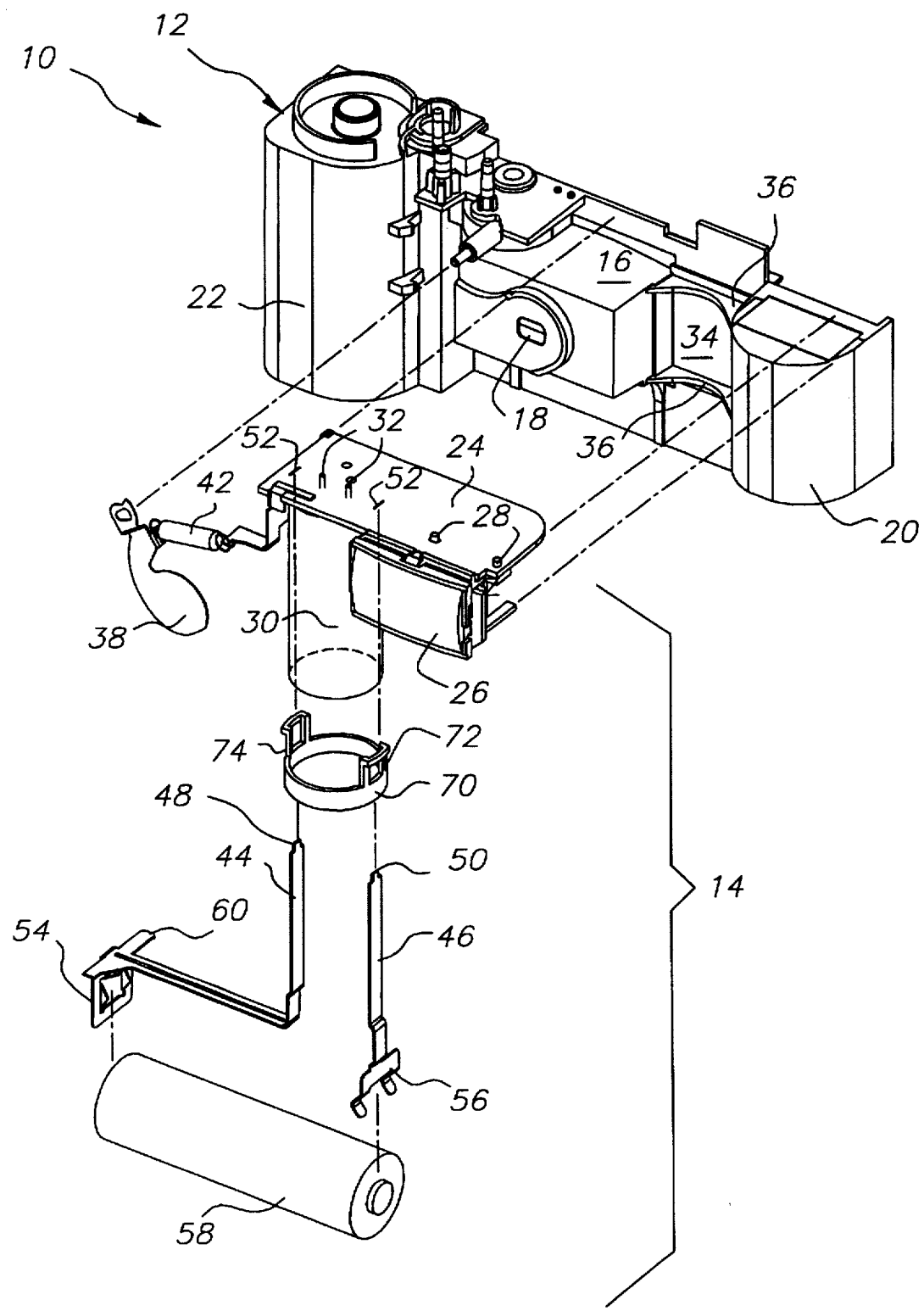
FIG. 4 is a front exploded perspective view of a one-time-use flash camera according to a second alternate embodiment of the invention.

Second Alternate Embodiment (FIG. 4)

FIG. 4 shows an alternate embodiment of the one-time-use flash camera 10 which is the same as in FIGS. 1 and 2 except that in place of the capacitor clasps 62 and 64 there is provided a plastic ring 70 dimensioned to encircle the flash capacitor 30 and fit between the two leads 44 and 46 to hold the flash capacitor between the leads. The ring 70 has respective substantially peripheral slots 72 that receive the two leads 44 and 46 to couple the ring with the leads.

Figure 5:
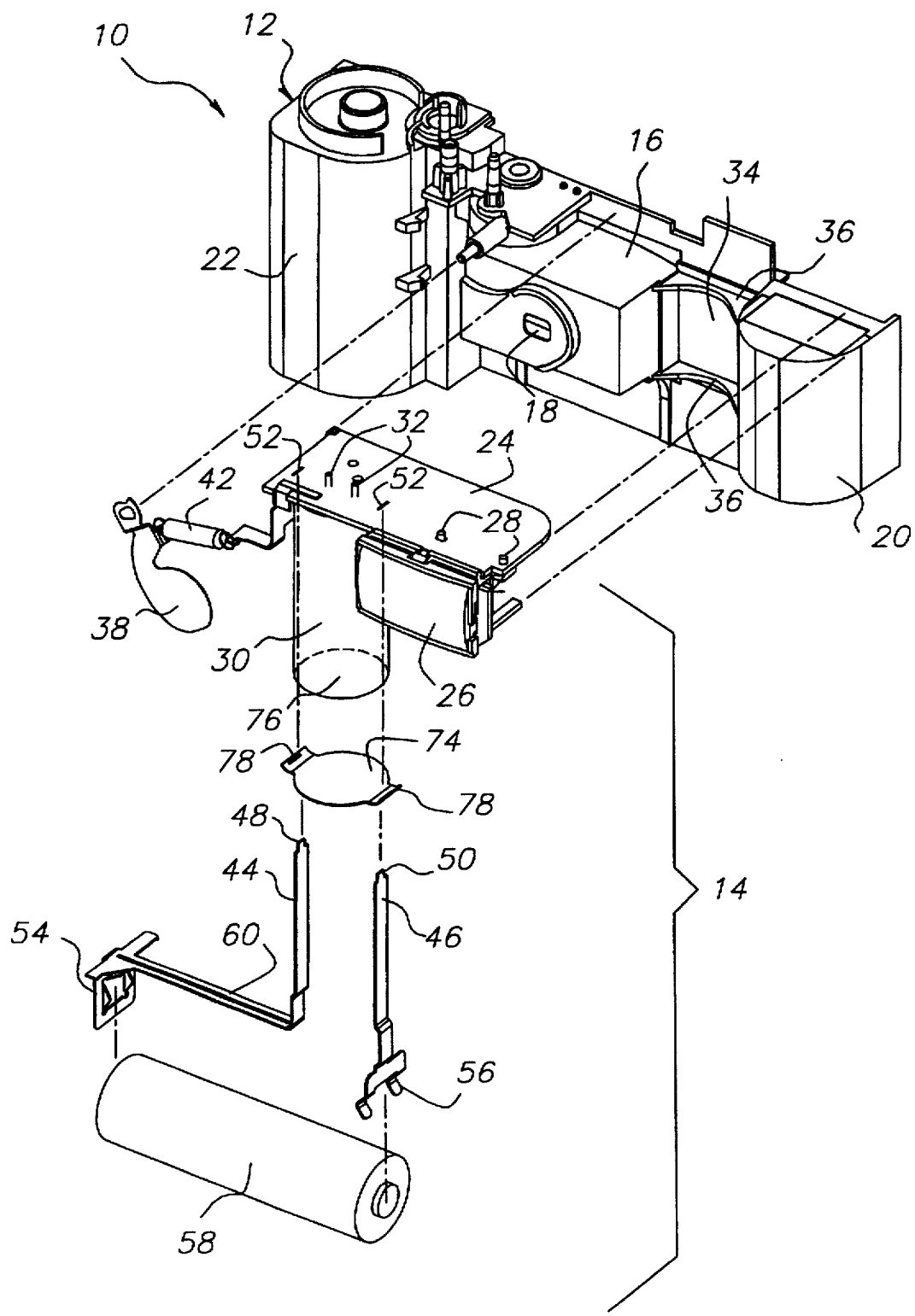
FIG. 5 is a front exploded perspective view of a one-time-use flash camera according to a third alternate embodiment of the invention.

Third Alternate Embodiment (FIG. 5)

FIG. 5 shows an alternate embodiment of the one-time-use flash camera 10 which is the same as in FIGS. 1 and 2 except that in place of the capacitor clasps 62 and 64 there is provided a plastic disk 74 which is located between the two leads 44 and 46 for supporting the flash capacitor 30 at its bottom end 76 between the leads. The disk 74 has respective substantially peripheral slots 78 that receive the two leads 44 and 46 to couple the disk with the leads.

The invention has been described with reference to a preferred embodiment. However, it will be appreciated that variations and modifications can be effected by a person of ordinary skill in the art without departing from the scope of the invention.

PARTS LIST 10. one-time-use flash camera
12. main body part
14. electronic flash assembly
16. light tunnel
18. lens opening
20. film roll chamber
22. cartridge chamber
24. flash circuit board
26. flash cover
28. solder points
30. flash capacitor
32. solder points
34. nest
36. ribs
38. shutter blade
40. pin
42. return spring
44. lead
46. lead
48. upper end
50. upper end
52. solder points
54. negative battery contact
56. positive battery contact
58. flash-powering battery
60. shutter-flash synchronization contact
62. capacitor clasp
64. capacitor clasp
66. ring
68. grooves
70. ring
72. slots
74. disk
76. bottom end
78. slots

What is claimed is:

1. A camera comprising a shutter-flash synchronization contact, a pair of battery contacts, a flash capacitor, and a flash circuit board conductively connected to said shutter-flash synchronization contact, said pair of battery contacts and said flash capacitor, is characterized in that:
   a holder which holds said flash capacitor is conductively connected to said flash circuit board and is integrally united with said shutter-flash synchronization contact and said pair of battery contacts to conductively connect the shutter-flash synchronization contact and the battery contacts to the flash circuit board.

2. A camera as recited in claim 1, wherein said holder includes a pair of capacitor clasps which are offset from one another to hold said flash capacitor between them without said capacitor clasps touching each other.

3. A camera as recited in claim 1, wherein said flash circuit board and said pair of battery contacts are relatively arranged to locate the flash circuit board and a flash-powering battery that is between the battery contacts parallel to one another, and said holder holds said flash capacitor perpendicular to and between said flash circuit board and the flash-powering battery.

4. A camera as recited in claim 3, wherein a main body part has a light tunnel and cartridge and film roll chambers spaced from respective sides of said light tunnel, said pair of battery holders are located between said cartridge and film roll chambers to hold the flash-powering battery longitudinally horizontal and below said light tunnel, said flash circuit board is located longitudinally horizontal and above said film roll chamber, and said flash capacitor is located longitudinally vertical and between said light tunnel and said film roll chamber.

5. A camera as recited in claim 1, wherein a shutter blade is conductively connected to said flash circuit board and is supported for movement between a lens covering position spaced from said shutter-flash synchronization contact and a lens uncovering position in conductive contact with the shutter-flash synchronization contact.

6. A camera as recited in claim 5, wherein a return spring biases said shutter blade to the lens covering position and is disposed to conductively connect the shutter blade to said flash circuit board.

7. A single-piece battery and flash capacitor holder, comprising:
   a single pair of spaced conductive leads to be connected to a flash circuit board and including respective integral positive and negative battery contacts for holding a flash-powering battery between them and respective integral capacitor clasps for holding a flash capacitor between them.

8. A single-piece battery and flash capacitor holder as recited in claim 7, wherein said capacitor clasps are offset from one another to avoid touching each other.

9. A single-piece battery and flash capacitor holder as recited in claim 7, wherein each of said leads has opposite ends one of which is to be connected to the flash circuit board and the other is one of said battery contacts, and said capacitor clasps are located between said opposite ends of the leads for holding the flash capacitor perpendicular to the flash-powering battery.

10. A combination battery and flash capacitor holder, comprising:
   a single pair of spaced conductive leads to be connected to a flash circuit board and including respective integral positive and negative battery contacts for holding a flash-powering battery between them; and a non-conductive capacitor holder disposed on said leads for holding a flash capacitor between the leads in fixed relation to the flash-powering battery.

11. A combination battery and flash capacitor holder as recited in claim 10, wherein said capacitor holder is a ring dimensioned to encircle the flash capacitor and said leads for holding the flash capacitor between the leads.

12. A combination battery and flash capacitor holder as recited in claim 10, wherein said capacitor holder is a ring which is located between said leads for holding the flash capacitor between the leads and has respective slots that receive said leads to couple said ring with the leads.

13. A combination battery and flash capacitor holder as recited in claim 10, wherein said capacitor holder is a disk which is located between said leads for supporting the flash capacitor at one end between the leads and has respective slots that receive said leads to couple said disk with the leads.

14. A combination battery and flash capacitor holder as recited in claim 10, wherein each of said leads has opposite ends one of which is to be connected to the flash circuit board and the other is one of said battery contacts, and said capacitor holder is located between said opposite ends of the leads to hold the flash capacitor perpendicular to the flash capacitor.

15. An electronic flash assembly comprising a shutter-flash synchronization contact, a pair of battery contacts, a flash capacitor, and a flash circuit board conductively connected to said shutter-flash synchronization contact, said pair of battery contacts and said flash capacitor, is characterized in that:

a single pair of spaced conductive leads is conductively connected to said flash circuit board and is integrally united with said shutter-flash synchronization contact and said pair of battery contacts to conductively connect the shutter-flash synchronization contact and the battery contacts to the flash circuit board; and a holder for said flash capacitor is disposed on said leads to hold the flash capacitor in fixed relation to a flash-powering battery that is between said pair of battery contacts.

16. A shutter and electronic flash assembly comprising a shutter-flash synchronization contact, a shutter blade supported for movement from a lens covering position spaced from said shutter-flash synchronization contact to a lens uncovering position in conductive contact with the shutter-flash synchronization contact, a flash capacitor, and a flash circuit board conductively connected to said shutter-flash synchronization contact and said flash capacitor, is characterized in that:

a single pair of spaced conductive leads is conductively connected to said flash circuit board and one of said leads is integrally united with said shutter-flash synchronization contact to conductively connect the shutter-flash synchronization contact to the flash circuit board;

said shutter blade is conductively connected to said flash circuit board; and a holder for said flash capacitor is disposed on said leads to hold the flash capacitor.

\* \* \* \* \*